(12) United States Patent
Lee

(10) Patent No.: US 8,437,814 B2
(45) Date of Patent: May 7, 2013

(54) SLIDE OPENING/CLOSING DEVICE, METHOD OF RESTRICTING SLIDING MOVEMENT OF SLIDE MEMBER, ELECTRONIC APPARATUS, AND MOBILE TERMINAL DEVICE

(75) Inventor: Youn Gook Lee, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 257 days.

(21) Appl. No.: 12/915,458

(22) Filed: Oct. 29, 2010

(65) Prior Publication Data

US 2011/0195761 A1 Aug. 11, 2011

Related U.S. Application Data

(60) Provisional application No. 61/302,991, filed on Feb. 10, 2010.

(51) Int. Cl.
*H04M 1/00* (2006.01)

(52) U.S. Cl.
USPC .......... 455/575.4; 29/428; 206/703; 220/324; 396/449; 379/433.12

(58) Field of Classification Search ............... 455/575.4; 206/307; 29/428; 220/703; 396/449; 379/433.12
See application file for complete search history.

(56) References Cited

U.S. PATENT DOCUMENTS

| | | | |
|---|---|---|---|
| 7,450,978 B2 * | 11/2008 | Park ........................... | 455/575.3 |
| 7,529,571 B2 * | 5/2009 | Byun et al. ................. | 455/575.4 |
| 7,599,723 B2 * | 10/2009 | Lee et al. ................... | 455/575.4 |
| 7,853,301 B2 * | 12/2010 | Kim et al. .................. | 455/575.4 |
| 7,953,465 B2 * | 5/2011 | Jeong et al. ................ | 455/575.4 |
| 8,155,719 B2 * | 4/2012 | Park ........................... | 455/575.4 |
| 8,285,349 B2 * | 10/2012 | Sato et al. .................. | 455/575.4 |
| 8,326,382 B2 * | 12/2012 | Wang .......................... | 455/575.4 |
| 2010/0001539 A1 * | 1/2010 | Kikuchi et al. ............... | 292/138 |

FOREIGN PATENT DOCUMENTS

JP 2002-90807 A 3/2002

* cited by examiner

*Primary Examiner* — Jinsong Hu
*Assistant Examiner* — Qun Shen
(74) *Attorney, Agent, or Firm* — Oblon, Spivak, McClelland, Maier & Neustadt, L.L.P.

(57) ABSTRACT

A slide opening/closing device that includes a housing; an opening formed in the housing; a lid with a protrusion, the lid being configured to cover the opening; a sliding member having an abutting claw, and a sliding-movement restricting member. The sliding member is mounted on the housing proximal to the opening and at least partially covering the lid and opening when sliding in one moving direction. The sliding-movement restricting member includes an abutting portion and is made of an elastic material. The abutting portion is configured to abut the abutting claw of the sliding member when the lid is detached from covering the opening, and the abutting portion is configured to be displaced from a path of the abutting claw that is in the one moving direction when the lid is attached to the housing to cover the opening.

10 Claims, 14 Drawing Sheets

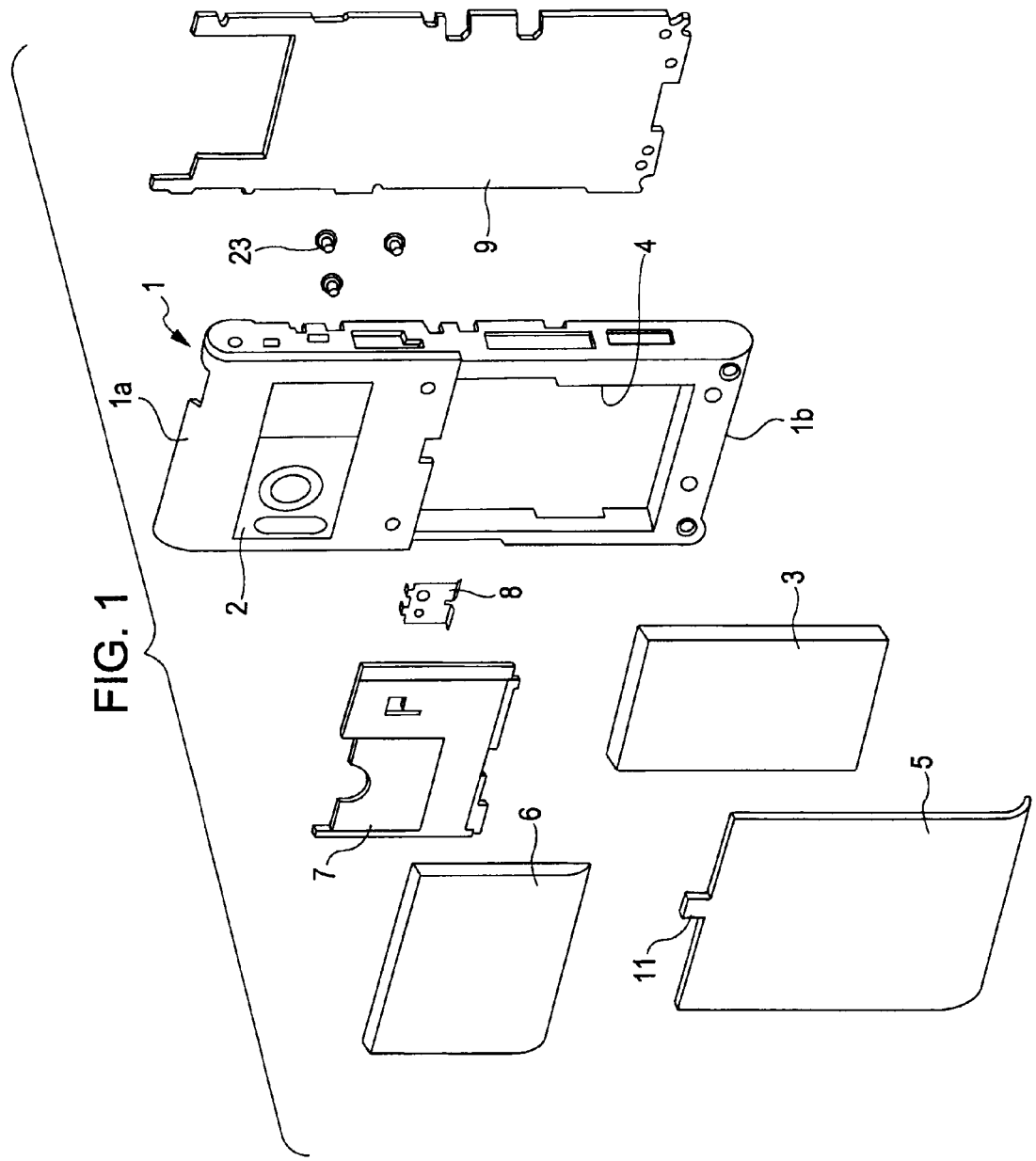

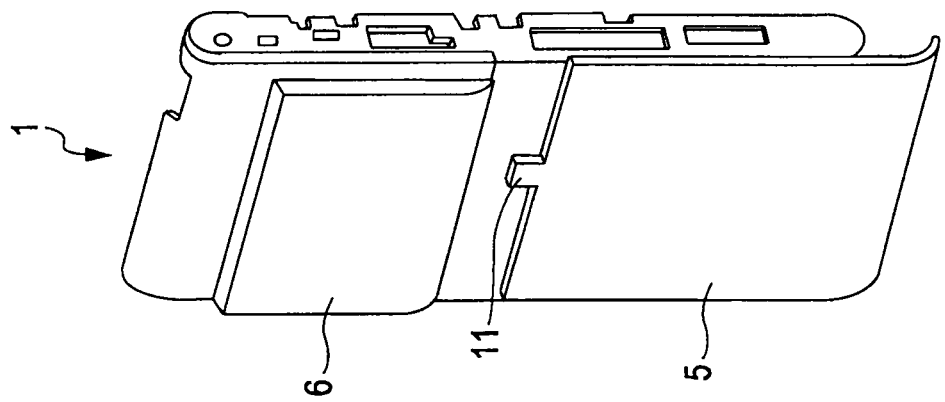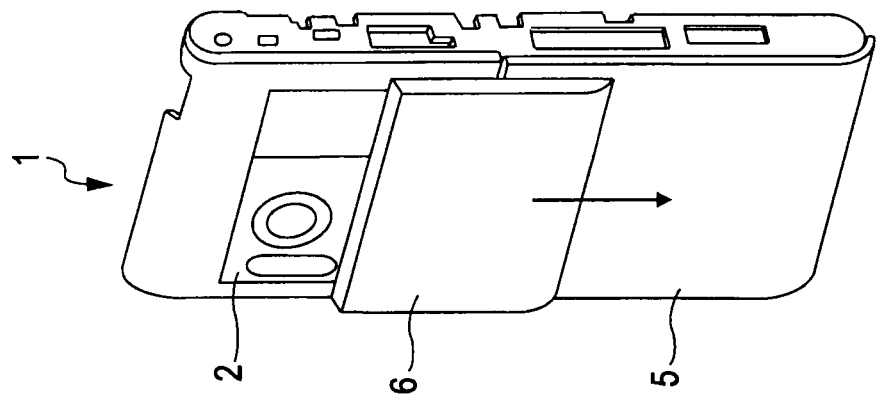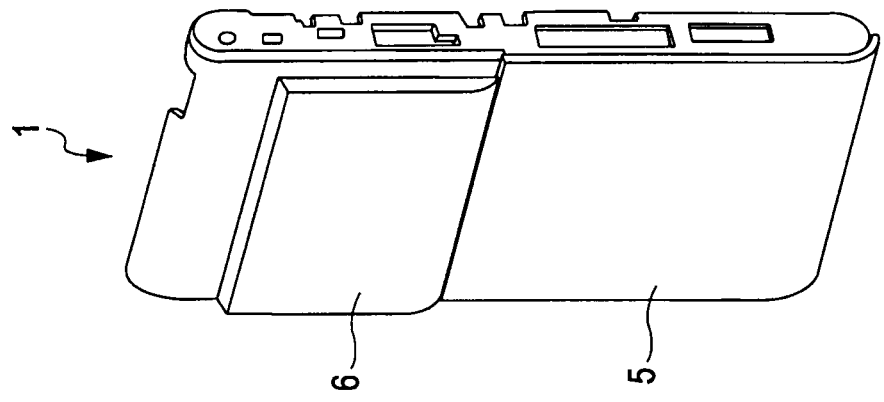

SLIDE OPENING/CLOSING DEVICE, METHOD OF RESTRICTING SLIDING MOVEMENT OF SLIDE MEMBER, ELECTRONIC APPARATUS, AND MOBILE TERMINAL DEVICE

CROSS REFERENCE TO RELATED APPLICATIONS

This application is related to and claims priority under 35 U.S.C. §119(e) to Provisional Application Ser. No. 61/302,991, filed Feb. 10, 2010, the contents of which are hereby incorporated herein by reference.

BACKGROUND

1. Field

This specification relates to a slide opening/closing device including a sliding member slidably mounted on a housing member, an opening formed at a position on which the sliding member overlaps when the sliding member is slid in a predetermined position, and a lid for the opening. This specification also relates to a method of restricting a sliding movement of a sliding member, an electronic apparatus, and a mobile terminal device.

2. Description of the Related Art

Japanese Unexamined Patent Application Published No. 2002-090807 discloses a camera having a slide cover member which is operatively connected to a power switch and can move between a first position for covering the front side of a photographic lens with the cover and a second position for allowing the cover to be separated from the front of the photographic lens, while avoiding a battery exchange when the power is being on.

In this camera, a slidable cover member prevents a battery lid from opening when the slidable cover member moves to the position of turning on the power. Thus, such a configuration of the camera prevents a battery from being removed from the camera when the power is on to avoid an adverse consequence, such as system malfunction, caused by forced shutdown of the system of the camera.

One of housing members, which have been known in the art, includes a slidable cover which can slide in a predetermined direction, an opening formed in an area where the slidable cover moves, and a lid detachably arranged on the opening. In this housing member, since the opening is formed at the position to which the slidable cover can slide and move to allow the sliding path of the slidable cover and the area of the opening can be superimposed on or overlapped with each other. Therefore, such a housing member can be miniaturized (shortened) as much as the area of the overlapped portion.

For this reason, nowadays, the housing members have been designed more often so that the sliding path of the slidable cover and the opening can be overlapped with each other, for example, like a mobile phone provided with a lens cover for camera lens formed on the housing member (such a cover corresponds to the aforementioned slidable cover) and a space for holding rechargeable battery (i.e., a battery holder) located at a position to which the lens cover moves (such a space corresponds to the aforementioned opening).

However, in the configuration of the housing in which the slidable movement track of the slidable cover overlaps the opening, the following disadvantages may be caused when the slidable cover is allowed to move and cover the opening while the lid is not placed on the opening.

1. When the slidable cover moves and slides while the user's finger is placed in the opening without the lid, the user's finger may be caught by the slidable cover.

2. When the lid is removed from the opening and the slidable cover is moved over the opening, for example, it becomes possible to apply force to the slide cover in the direction different from the moving direction thereof so that the user's finger can catch and pull the slidable cover upward. For this reason, if the slidable cover is allowed to move over the opening while the lid is removed from the opening, the sliding mechanism of the slidable cover or the slidable cover itself may be deformed or damaged by the force applied to the slidable cover in the direction different from the moving direction thereof.

3. If the slidable cover moves on the opening without the lid, it becomes difficult to take a material out of the opening and to place a material therein. When the user forcibly tries to take the material out of the opening while keeping the slidable cover moved on the opening without the lid, the slidable cover receives the force in the direction different from the moving direction thereof and may be possibly deformed or damaged. When the user forcibly tries to put a material into the opening while keeping the slidable cover moved on the opening without the lid, the slidable cover receives the force in the direction different from the moving direction thereof and may be possibly deformed or damaged.

Such deformation or damage of the slidable cover can be prevented to some extent by improving the strength thereof by forming the slidable cover itself, the sliding mechanism thereof, or the like using a hard member, such as a metal member. However, for example, when a dielectric member, such as the above metal member, is used for improving the strength of the slidable cover itself or the sliding mechanism thereof in a wireless communication apparatus such as a mobile phone, such a dielectric member may affect on the antenna characteristics of the wireless communication antenna or may cause a difficulty in design or installation of the antenna.

Therefore, the present specification has been made in consideration of the aforementioned subject and responds to demands of a slide opening/closing device, a method of restricting a sliding movement of a slide member, and electronic apparatus, and a mobile terminal device.

BRIEF SUMMARY

According to an embodiment, a slide opening/closing device includes: a housing; an opening formed in the housing; a lid with a protrusion, the lid being configured to cover the opening; a sliding member having an abutting claw, the sliding member being mounted on the housing proximal to the opening and at least partially covering the lid and opening when sliding in one moving direction; and a sliding-movement restricting member, which includes an abutting portion and which is made of an elastic material, the abutting portion being configured to abut the abutting claw of the sliding member when the lid is detached from covering the opening, and the abutting portion is configured to be displaced from a path of the abutting claw that is in the one moving direction when the lid is attached to the housing to cover the opening.

According to another embodiment, a method of restricting sliding movement of a sliding member is provided, which is implemented on a slide opening/closing device that includes a housing; an opening formed in the housing, a lid with a protrusion, the lid being configured to cover the opening; the sliding member having an abutting claw, the sliding member being mounted on the housing proximal to the opening and at least partially covering the lid when sliding in one moving direction; and a sliding-movement restricting member which includes an abutting portion and which is made of an elastic material. The method includes abutting, with the abutting portion of the sliding-movement restricting member, the abutting claw of the sliding member when the lid is detached from covering the opening; and displacing the abutting portion of the sliding-movement restricting member from a path of the abutting claw that is in the one moving direction when the lid is attached to the housing to cover the opening.

According to another embodiment, an electronic apparatus is provided which includes an electronic device; a slide opening/closing device including a housing upon which the electronic device is mounted; an opening formed in the housing; a lid with a protrusion, the lid being configured to cover the opening; a sliding member having an abutting claw, the sliding member being mounted on the housing proximal to the opening and at least partially covering the lid and opening when sliding in one moving direction; and a sliding-movement restricting member, which includes an abutting portion and which is made of an elastic material, the abutting portion being configured to abut the abutting claw of the sliding member when the lid is detached from covering the opening, and the abutting portion is configured to be displaced from a path of the abutting claw that is in the one moving direction when the lid is attached to the housing to cover the opening.

According to another embodiment, a mobile terminal device is provided which includes an antenna configured to perform wireless communication; an electronic device; a slide opening/closing device including a housing upon which the electronic device mounted; an opening formed in the housing; a lid with a protrusion, the lid being configured to cover the opening; a sliding member having an abutting claw, the sliding member being mounted on the housing proximal to the opening and at least partially covering the lid and opening when sliding in one moving direction; and a sliding-movement restricting member, which includes an abutting portion and which is made of an elastic material, the abutting portion being configured to abut the abutting claw of the sliding member when the lid is detached from covering the opening, and the abutting portion is configured to move out of a path of the abutting claw that is in the one moving direction when the lid is attached to the housing to cover the opening.

BRIEF DESCRIPTION OF THE DRAWINGS

FIG. 1 is an exploded perspective view of the main part of a mobile phone according to a first embodiment;

FIG. 6 is a perspective view of the mobile phone according to the first embodiment, viewed from a lower housing unit thereof;

DETAILED DESCRIPTION

Figure 2A:
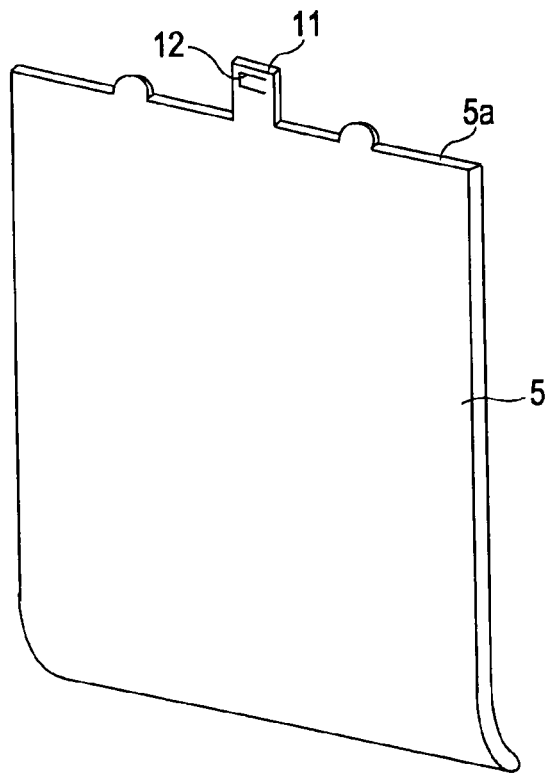
FIG. 2 is a perspective view of a battery lid of the mobile phone according to the first embodiment.

First, the configuration of a mobile phone according to a first embodiment will be described.

The mobile phone of the first embodiment is a so-called slide type mobile phone. The mobile phone includes an upper housing member and a lower housing unit which are substantially the same dimensions and slidable with respect to each other. The mobile phone is provided with a sliding mechanism that allows the upper housing member and the lower housing to be slidable in the direction along the longitudinal direction of each housing member.

On the upper side of the upper housing member (the side opposite to one facing to the lower housing unit), a display part, such as a liquid display part or an organic electro-luminescence (EL) display part, an auxiliary operation unit, and the like are formed.

In addition, on the upper side of the lower housing unit (the side facing to the upper housing unit), a main operation part including a plurality of push keys for operation, keys for rotary operation, and the like is formed.

Both the display unit and the auxiliary operation unit, which were mounted on the upper surface portion of the upper housing member, are typically exposed irrespective of their respective sliding positions. In addition, when the housing members are partially overlapped with each other by the sliding movements of the respective housing members, the main operation part or the like formed on the upper side of the lower housing unit can be exposed.

[Configuration of Main Part of Mobile Phone]

FIG. 1 is an exploded perspective view of the main part of the above-mentioned lower housing unit of the mobile phone. As is evident from FIG. 1, the lower housing unit 1 of the mobile phone includes a camera-mounting portion 2 on which a camera unit can be mounted. The camera-mounting portion 2 occupies almost one-third of the area extending from the upper end 1a to the lower end 1b of the lower housing unit 1.

In addition, the lower housing unit 1 includes a battery holder 4 between the lower end 1b of the lower housing unit 1 and the camera-mounting portion 2. The battery holder 4 is an opening for housing a rechargeable battery 3 in the shape of a generally rectangular long plate.

Furthermore, a battery lid 5 can be removably attached to a portion corresponding to the above battery holder 4 of the lower housing unit 1. A user can detach the battery lid 5 from the lower housing unit 1 and then house the rechargeable battery 3 in the battery holder 4. In addition, the user can detach the battery lid 5 from the lower housing unit 1 and then removes the rechargeable battery 3 from the battery holder 4.

Furthermore, the portion corresponding to the above camera-mounting portion 2 of the lower housing unit 1 is configured to be attached with a camera cover 6 and a sliding mechanism 7. The camera cover 6 is provided for protecting the camera lens or the like of the camera unit from impact and dust, while the sliding mechanism is provided for sliding the camera cover 6 in the longitudinal direction of the camera cover 6.

The mobile phone of the present embodiment is designed to be shortened in the longitudinal direction of the lower housing unit 1 by arranging the battery holder 4 near the camera-mounting portion 2. In this case, since the battery holder 4 is formed near the camera-mounting portion 2, the battery holder 4 can be partially or entirely covered with the camera cover 6 by sliding movement of the camera cover 6 to expose the camera-mounting portion 2. Furthermore, if the camera cover 6 is slid and moved in the direction of exposing the camera-mounting portion 2 while the battery lid 5 is being removed, any of the plurality of the disadvantages listed above may be caused.

Therefore, as will be described later, the mobile phone of the present embodiment has an abutting claw (denoted by reference numeral 21 in FIG. 3) protruded in the thickness direction of the lower housing unit 1 when the sliding mechanism 7 is attached to the lower housing unit 1. This abutting claw inhibits the sliding movement of camera cover 6 fixed to the sliding mechanism 7 by also contacting with the abutting portion of a sliding-movement restricting member 8 described later when the battery lid 5 is being removed from the lower housing unit 1. The lower housing unit 1 is equipped with the sliding-movement restricting member 8 shown in FIG. 1 so that the abutting claw of the above sliding mechanism 7 will be brought into contact with the abutting portion of the sliding-movement restricting member 8 when the battery lid 5 is being removed from the lower housing unit 1.

The lower housing unit 1 houses a printed circuit board 9 on which various circuits (e.g., a central control circuit (CPU) and a communication circuit) are mounted. Each circuit mounted on this printed circuit board 9 can operate using electric power supplied from the rechargeable battery 3 in the above battery holder 4 to allow the mobile phone to perform wireless communications, various kinds of signal processing, various kinds of information processing, and the like.

[Configuration of Battery Lid]

FIG. 2A is a perspective diagram of the battery lid 5 viewed from the upper side of the rechargeable battery 3 (the side opposite to one facing to the rechargeable battery 3).

As shown in FIG. 2A, the battery lid 5 is made of a hardened material including a hardened plastic material such as acrylonitrile butadiene styrene (ABS) resin or polycarbonate resin, or a metal material and formed of a generally plate with a size enough to cover the rechargeable battery 3 housed in the battery holder 4 of the lower housing unit 1.

A protrusion 11 is formed on almost the center of the upper end 5a of the battery lid 5. The protrusion 11 can be adjacent to the camera-mounting portion 2 when the battery lid 5 is attached to the lower housing unit 1. In other words, the protrusion 11 sticks out to the camera-mounting portion 2 when being attached to the lower housing unit 1.

Figure 2B:
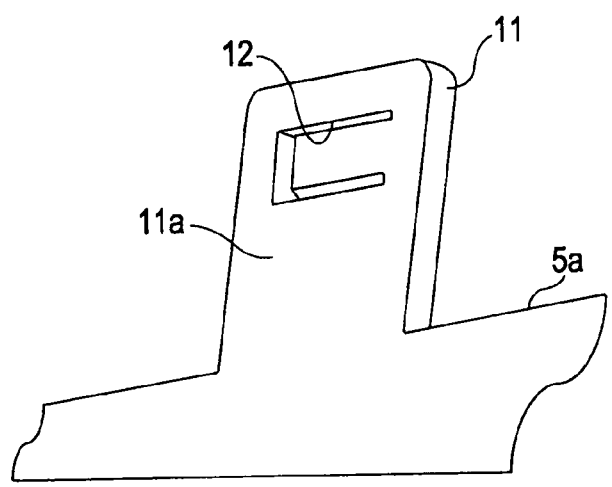

FIG. 2B is an enlarged perspective diagram of the protrusion 11 viewed from the upper side of the battery lid 5. As shown in FIG. 2B, a concave fitting portion 12 is formed as a generally U-shaped cut-out in the upper side 11a of the protrusion 11.

The concave fitting portion 12 of the protrusion 11 can be fit with a convex fitting portion (reference numeral 20 in FIG. 3) formed on a fixing plate attached to the lower housing unit 1 when the battery lid 5 is attached to the lower housing unit 1. Therefore, the battery lid 5 can be fixed on the lower housing unit 1 via the fixing plate.

In the mobile phone of the first embodiment, the abutting claw of the sliding mechanism 7 is allowed to contact with the abutting portion of the sliding-movement restricting member 8 when the battery lid 5 is being detached from the lower housing unit 1. Thus, the camera cover 6 on the sliding mechanism 7 is prevented from performing a sliding movement from a position where it covers the camera unit to a position where the camera unit is exposed (i.e., in a locked state).

In other words, in the mobile phone of the first embodiment, when the battery lid 5 is being detached from the lower housing unit 1, on the position where the camera cover 6 covers the camera unit, the abutting claw of the sliding mechanism 7 can abut the abutting portion of sliding-movement restricting member 8. Thus, the camera cover 6 on the sliding mechanism 7 is prevented from performing a sliding movement from a position where it covers the camera unit to a position where the camera unit is exposed.

In addition, when the battery lid 5 is attached to the lower housing unit 1, the abutting claw of sliding mechanism 7 is off from the abutting portion of sliding-movement restricting member 8. The camera cover 6 is allowed to perform a sliding movement between the position where the camera cover 6 covers the camera unit and the position where the camera unit is exposed (i.e., in an unlocked state).

The protrusion 11 of the battery lid 5 acts on the sliding-movement restricting member 8 when the battery lid 5 is attached to the lower housing unit 1 and then brings the abutting portion of the sliding-movement restricting member 8 and the abutting claw of the sliding mechanism 7 into the above unlocked state.

In addition, when the protrusion 11 of the battery lid 5 is apart from the sliding-movement restricting member 8 by removing the battery lid 5 from the lower housing unit 1, the abutting portion of the sliding-movement restricting member 8 and the abutting claw of the sliding mechanism 7 are brought into the above locked state. The details will be described later.

[Configuration of Sliding Mechanism]

Figure 3A:
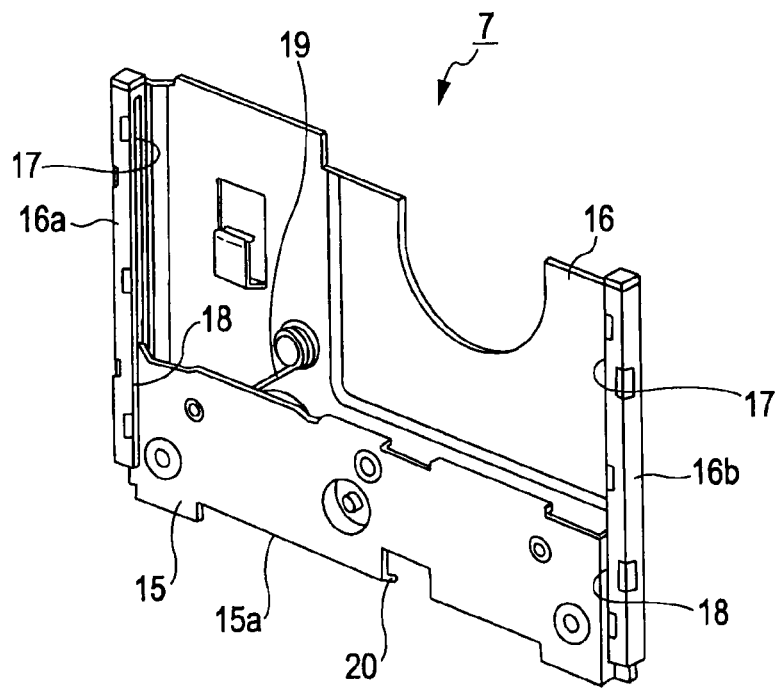
FIG. 3 is a perspective view of a sliding mechanism of the mobile phone according to the first embodiment.
Figure 3B:
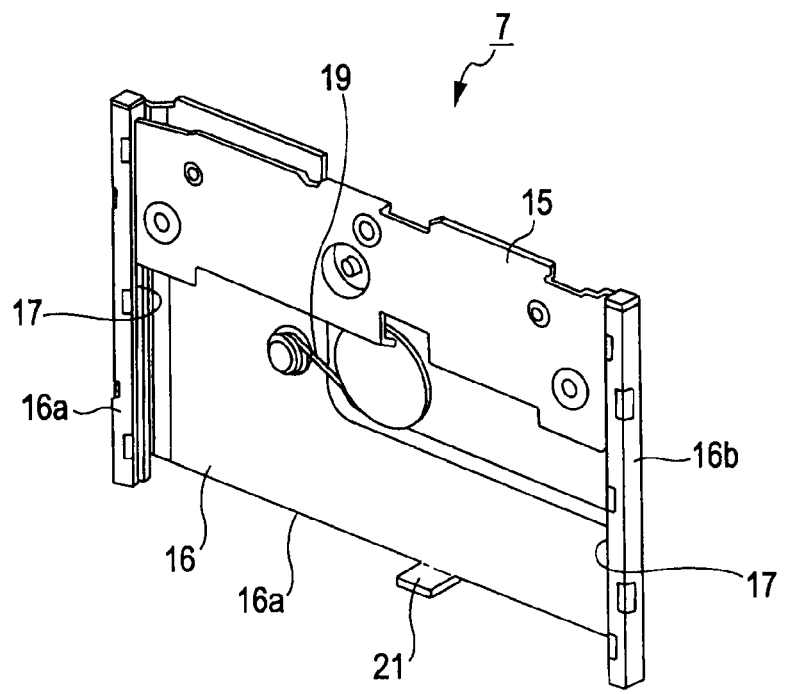

FIG. 3A and FIG. 3B are perspective diagrams illustrating the sliding mechanism 7 of the camera cover 6, respectively. Each of these figures illustrates the perspective view of the sliding mechanism 7 viewed from the side facing to the camera-mounting portion 2 (the side opposite to one on which the camera cover 6 is mounted). More specifically, FIG. 3A is the perspective view of the sliding mechanism 7 in a state of covering the camera unit (closed state) and FIG. 3B is the perspective view of the sliding mechanism 7 in a state of exposing the camera unit (opened state).

As shown in FIG. 3A and FIG. 3B, the sliding mechanism 7 includes the fixing plate 15 to be fixed on the lower housing unit 1 and a slide plate 16 to be slid in the longitudinal direction of the mobile phone.

The slide plate 16 has a lateral length corresponding to the widthwise direction of the mobile phone. Here, the lateral length of the slide plate 16 is slightly shorter than the width of the mobile phone in the widthwise direction thereof. In addition, the slide plate 16 also has a longitudinal length corresponding to the longitudinal direction of the mobile phone. Here, the longitudinal length of the slide plate 16 is slightly longer than the longitudinal length of the camera-mounting portion 2.

The ends 16a and 16b of the slide plate 16 in the longitudinal direction of the mobile phone are inwardly bent into generally U-shapes to form sliding grooves 17, respectively.

In addition, an abutting claw 21 is formed near almost the middle of the lower end 16a of the slide plate 16 so that it can protrude in the thickness direction of the lower housing unit 1 when the sliding mechanism 7 is mounted on the lower housing unit 1. The abutting claw 21 abuts the abutting portion of the sliding-movement restricting member 8 as described later to inhibit the sliding movement of the slide plate 16 (the sliding movement of the camera cover 6 fixed on the slide plate 16).

On the other hand, the fixing plate 15 has a lateral length corresponding to the widthwise direction of the mobile phone. Here, the lateral length of the fixing plate 15 is slightly shorter than the lateral length of the slide plate 16. The fixing plate 15 also has a longitudinal length corresponding to the longitudinal direction of the mobile phone. Here, the longitudinal length of the fixing plate 15 is almost two third of the longitudinal length of the slide plate 16.

Screws 23 shown in FIG. 1 are used for fixing the fixing plate 15 near the camera-mounting portion 2 of the lower housing unit 1 together with the sliding-movement restricting member 8 which will be described later.

In addition, the both ends of the fixing plate 15 in the longitudinal direction of the mobile phone are provided with protrusions 18, respectively. These protrusions 18 can engage the respective sliding grooves 17 of the slide plate 16.

Furthermore, a convex fitting portion 20 is formed on almost the middle of the lower end 15a of the fixing plate 15. The convex fitting portion 20 extends outward from the lower housing unit 1 when the fixing plate 15 is fixed on the lower housing unit 1 by screws 23. The convex fitting portion 20 fits a concave fitting portion 12 (see FIG. 2B) formed in the protrusion 11 of the battery lid 5 when the battery lid 5 is attached to the lower housing unit 1. Therefore, the battery lid 5 can be fixed on the lower housing unit 1 via the convex fitting portion 20.

Furthermore, the battery lid 5 is of a plate shape as described above, so that it may have a certain degree of elasticity. Thus, when the user presses near the protrusion of the cell battery 5 by a user's finger or the like in the thickness direction of the mobile phone while the battery lid 5 is being attached to the lower housing unit 1, the pressing force causes a dent on the surface near the protrusion of the battery lid 5. Therefore, it leads to release the convex fitting portion 20 of the fixing plate 15 from the concave fitting portion 12 of the protrusion 11 of the battery lid 5, thereby allowing the battery lid 5 to be removed from the lower housing unit 1.

In other words, the sliding mechanism 7 is designed to engage the protrusions 18 of the fixing plate 15 to the respective sliding grooves 17 of the slide plate 16. Thus, the fixing plate 15 and the slide plate 16 are allowed to unit together and allowing the slide plate 16 to be slid in the longitudinal direction of the mobile phone.

Furthermore, the sliding mechanism 7 is provided with a generally nine (9)-shaped spring 19 where one end thereof is rotatably connected to the fixing plate 15 and the other end thereof is rotatably connected to the slide plate 16.

Since the one end of the spring 19 is rotatably connected to the fixing plate 15 and the other end thereof is rotatably connected to the slide plate 16, the spring 19 can turn depending on the sliding position of the slide plate 16 with respect to the fixing plate 15 to change its biasing direction.

Specifically, in the opened state in which the slide plate 16 covers the camera unit, the spring 19 is biased in the direction of bringing the slide plate 16 into the closed state. The slide plate 16 performs a sliding movement to change from its closed state to the opened state. At this time the spring 19 turns in proportion to the sliding movement of the slide plate 16. Furthermore, when the slide plate 16 is located at a position over the intermediate between the closed state and the opened state and closer to the opened state, the spring 19 changes its biasing direction to the direction that brings the spring 19 into the opened state.

Therefore, if the slide plate 16 performs a sliding movement to change from its closed state to the opened state, the biasing force of the spring 19 causes the slide plate 16 to automatically fall in the opened state when the slide plate 16 is located at a position over the intermediate between the closed state and the opened state.

In contrast, in the closed state where the slide plate 16 exposes the camera unit, the spring 19 is only biased in the direction of bringing the slide plate 16 into the closed state. If the sliding movement of the slide plate 16 is performed so that it can be changed from the opened state to the closed state, the spring 19 turns in proportion to the sliding movement of the slide plate 16. Furthermore, when the slide plate 16 is located at a position over the intermediate between the opened state and the closed state and closer to the closed state, the spring 19 changes its biasing direction to the direction that brings the spring 19 into the closed state.

Therefore, if the slide plate 16 performs a sliding movement to change from its opened state to the closed state, the biasing force of the spring 19 causes the slide plate 16 to automatically fall in the closed state when the slide plate 16 is located at a position over the intermediate between the opened state and the closed state.

[Configuration of Sliding-Movement Restricting Member]

Figure 4A:
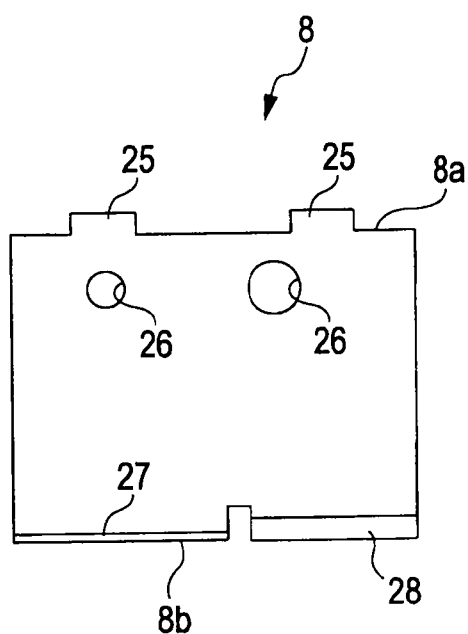
FIG. 4 is a perspective view of a sliding-movement restricting member installed in the mobile phone according to the first embodiment, where the sliding-movement restricting member is in an uncurved state.
Figure 4B:
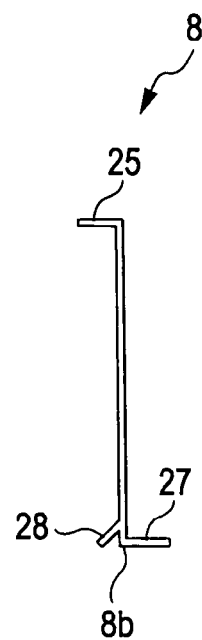
Figure 4C:
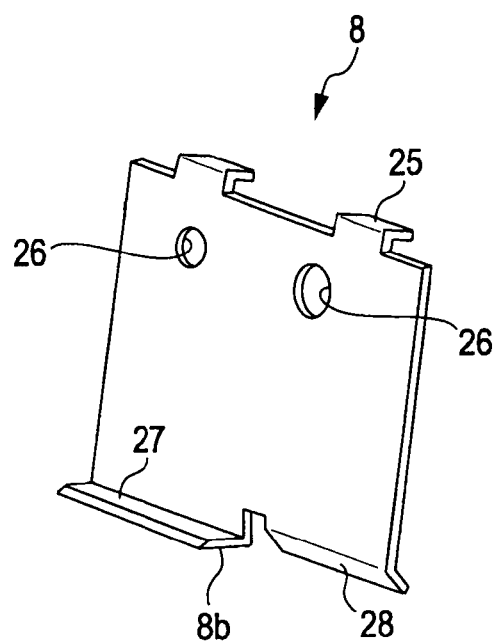

Next, FIG. 4A is a front view of the sliding-movement restricting member 8, FIG. 4B is a side view of the sliding-movement restricting member 8, and FIG. 4C is a perspective view of the sliding-movement restricting member 8. Among them, FIG. 4A represents the slide-moving restricting member 8, viewed from the side opposite to one facing to the lower housing unit 1 when attaching to the lower housing unit 1. FIG. 4B represents the slide-moving restricting member 8 viewed from the left side of the slide-moving restricting member 8 with respect to FIG. 4A. In addition, FIG. 4C represents the slide-moving restricting member 8 obliquely viewed from the side opposite to one facing to the lower housing unit 1 when attaching to the lower housing unit 1.

The sliding-movement restricting member 8 is made of a metal material, such as steel, or may be made of a hardened plastic material, such as acrylonitrile butadiene styrene (ABS) resin, in the form of a plate to serve as a plate spring provided with elasticity. The sliding-movement restricting member 8 is formed of a horizontally long rectangle as shown in FIG. 4A viewed from the side opposite to one facing to the lower housing unit 1 when the sliding-movement restricting member 8 is attached to the lower housing unit 1.

A pair of claws 25 is formed on the upper end 8a of the sliding-movement restricting member 8. The claws 25 are formed by cutting out the upper end 8a of the sliding-movement restricting member 8 and then bending as shown in FIG. 4B so that claws 25 can extend toward the lower housing unit 1 when the sliding-movement restricting member 8 is attached to the lower housing unit 1. In addition, a pair of screw holes 26 is formed in near the upper end 8a of the sliding-movement restricting member 8.

In addition, the generally middle of the lower end 8b of the sliding-movement restricting member 8 is cut out and two divided end portions are then bent in the opposite directions while being bounded by such a generally middle portion. One of the bent portions is an abutting portion 27. Specifically, as shown in FIG. 4A, the abutting portion 27 is the left part of the lower end 8b with respect to the face of the drawing abuts the abutting claw 21 (see FIG. 3B) formed on the slide plate 16 of the sliding mechanism 7 when the battery lid 5 is being detached. This abutting portion 27 inhibits the sliding movement of the slide plate 16 (the sliding movement of the camera cover 6 fixed on the slide plate 16). As shown in FIG. 4A, furthermore, the right part of the lower end 8b with respect to the face of the drawing serves as an introduction bent portion 28. When the battery lid 5 is attached to the lower housing unit 1, the introduction bent portion 28 introduces the protrusion 11 of the battery lid 5 into between the sliding-movement restricting member 8 and the fixing plate 15 of the sliding mechanism 7.

As shown in FIG. 4A to FIG. 4B, the abutting portion 27 is formed by bending the lower end 8b of the sliding-movement restricting member 8 substantially at a right angle so that the abutting portion 27 can extend toward the slide plate 16 of the sliding mechanism 7 when the sliding-movement restricting member 8 is attached to the lower housing unit 1.

In addition, the introduction bent portion 28 is formed by bending the lower end 8b of the sliding-movement restricting member 8. That is, the introduction bent portion 28 is formed substantially at an angle of 45 degrees in the direction toward the lower housing unit 1. Thus, the introduction bent portion 28 can introduce smoothly the protrusion 11 of the battery lid 5 into between the sliding-movement restricting member 8 concerned and the fixing plate 15 of the sliding mechanism 7 when the battery lid 5 is attached to the lower housing unit 1.

In the sliding-movement restricting member 8, when the battery lid 5 is attached to the lower housing unit 1, the introduction bent portion 28 being bent at an angle of almost 45 degrees is functioned to introduce the protrusion 11 of the battery lid 5 into between the sliding-movement restricting member 8 and the fixing part 15 of the sliding mechanism 7. Therefore, the sliding-movement restricting member 8 is pressed toward the lower housing unit 1 by the pressing force of the above protrusion 11 and the sliding-movement restricting member 8 is then curved from the lower end 8b to the generally middle portion thereof outwardly toward the lower housing unit 1.

Figure 5A:
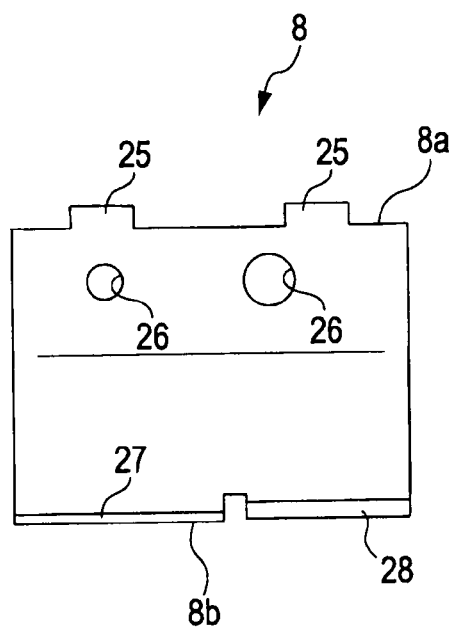
FIG. 5 is a perspective view of a sliding-movement restricting member installed in the mobile phone according to the first embodiment, where the sliding-movement restricting member is in a curved state.
Figure 5B:
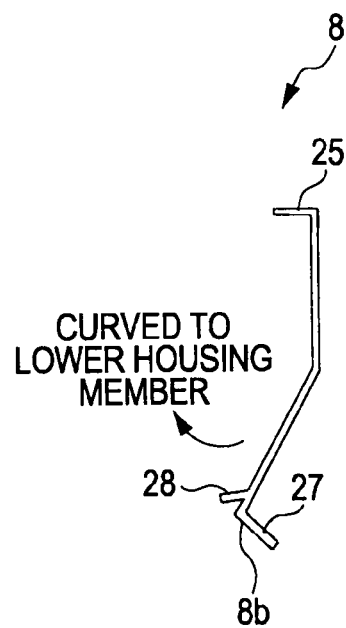
Figure 5C:
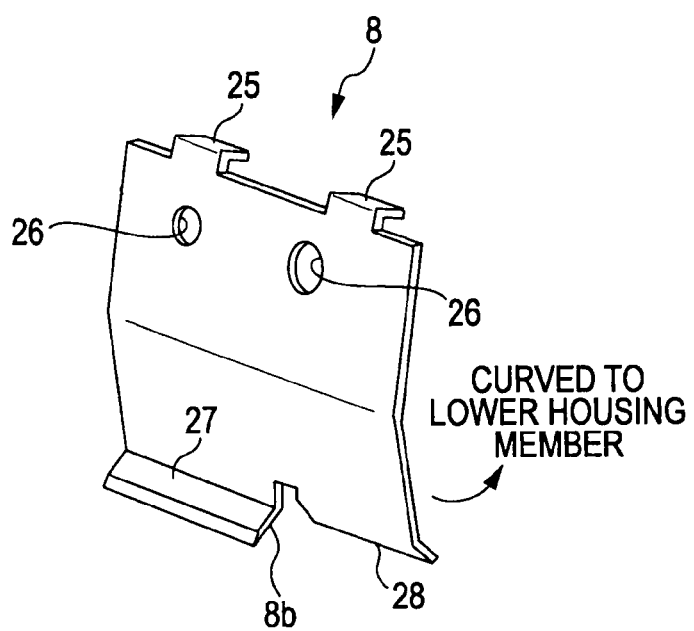

FIG. 5A is a diagram illustrating the curved sliding-movement restricting member 8 viewed from the side opposite to one facing to the lower housing unit 1. FIG. 5B is a diagram illustrating the sliding-movement restricting member 8, which is curved outwardly toward the lower housing unit 1 shown in FIG. 5A, viewed from the left side with respect to the surface of the drawing. Furthermore, FIG. 5C is a diagram illustrating the sliding-movement restricting member 8, which is curved outwardly toward the lower housing unit 1 shown in FIG. 5A, obliquely viewed from the side opposite to one facing to the lower housing unit 1.

From FIG. 5A to FIG. 5B, the protrusion 11 of the battery lid 5 is introduced into between the sliding-movement restricting member 8 and the fixing plate 15 of the sliding mechanism 7. It is obvious that the pressing force of the protrusion 11 presses the sliding-movement restricting member 8 toward the lower housing unit 1 and the sliding-movement restricting member 8 is then curved from the lower end 8b to the generally middle portion thereof outwardly toward the lower housing unit 1.

As will be described later, in the case of the mobile phone of the present embodiment, while the lower housing unit 1 is being attached to the battery lid 5, the sliding-movement restricting member 8 is curved by the protrusion 11 of the battery lid 5 to allow the abutting portion 27 of the sliding-movement restricting member 8 to leave the sliding movement course of the slide plate 16 of the sliding mechanism 7. Therefore, while the battery lid 5 is being attached to the lower housing unit 1, the contact between the abutting portion 27 of the sliding-movement restricting member 8 and the abutting claw 21 of the slide plate 16 of the sliding mechanism 7 is released, thereby allowing the sliding movement of the camera cover 6 fixed on the slide plate 16 to be performed.

Furthermore, in the case of the mobile phone of the present embodiment, since the battery lid 5 is removed from the lower housing unit 1, the protrusion 11 is pulled out of between the sliding-movement restricting member 8 and the fixing plate 15 of the sliding mechanism 7, the sliding-movement restricting member 8 is recovered from the curved configuration thereof to its original configuration. Therefore, when the protrusion 11 is pulled out of between the sliding-movement restricting member 8 and the fixing plate 15 of the sliding mechanism 7, the abutting portion 27 of the sliding-movement restricting member 8 comes to be located on the sliding movement course of the slide plate 16. Thus, a state in which the abutting portion 27 of the sliding-movement restricting member 8 and the abutting claw 21 of the slide plate 16 may be brought into contact with each other restricts the sliding movement of the camera cover 6 fixed on the slide plate 16.

[Operation for Controlling Sliding Movement of Mobile Phone]

Next, the operation for controlling the sliding movement of the camera cover 6 in the mobile phone of the present embodiment, which is configured as described above, will be described.

[Operation for Controlling Sliding Movement when Attaching Battery Lid]

Figure 7:
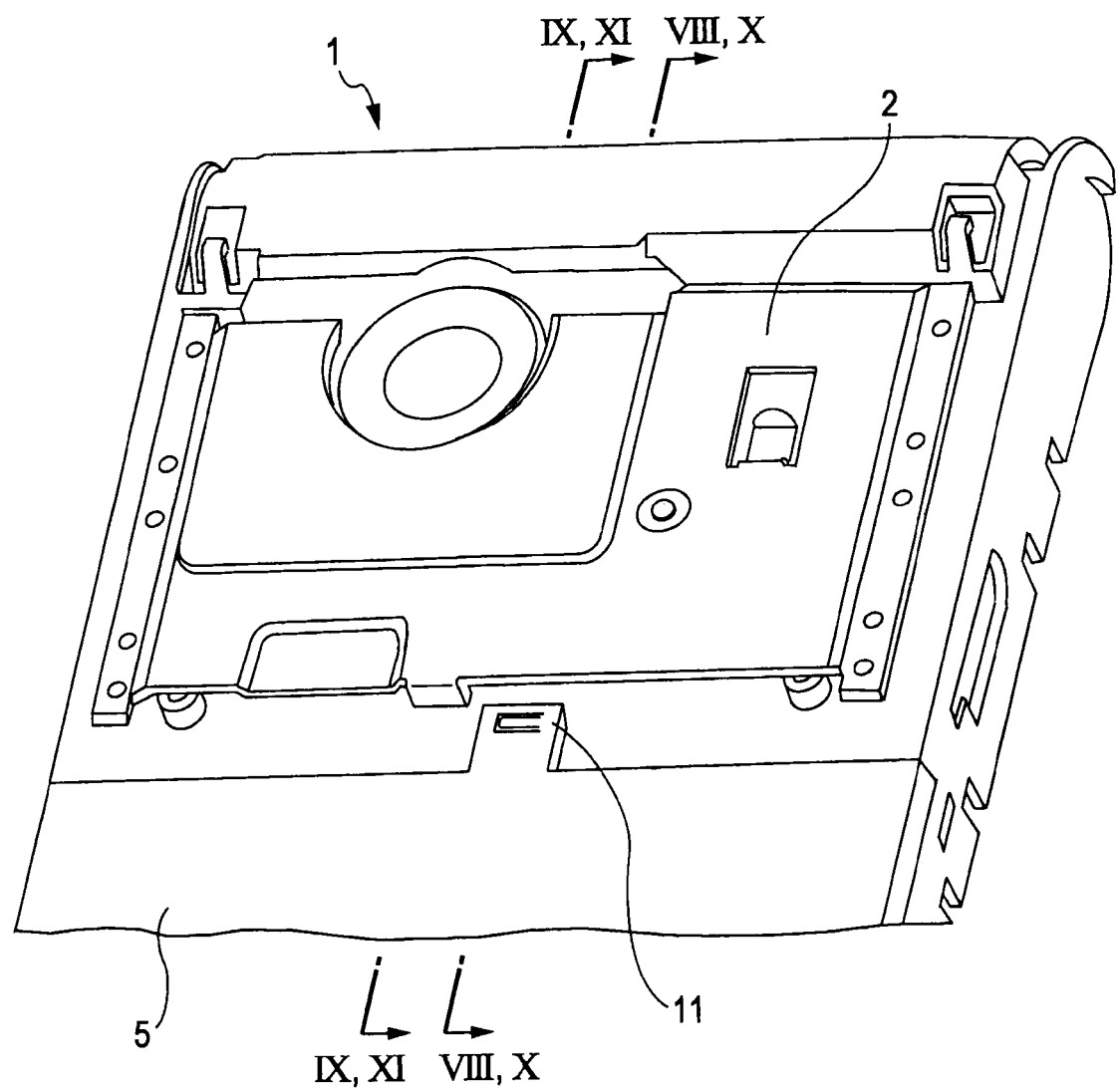
FIG. 7 is an enlarged perspective view of a camera-mounting portion of the mobile phone according to the first embodiment.

FIG. 6A is a diagram illustrating the mobile phone with the battery lid 5 attached to the lower housing unit 1, obliquely viewed from the battery lid 5. FIG. 7 is an enlarged perspective diagram illustrating the camera-mounting portion 2 of the mobile phone without the camera cover 6 in a state that the battery lid 5 is being attached to the lower housing unit 1.

As shown in FIG. 6A and FIG. 7, when the battery lid 5 is attached to the lower housing unit 1, the protrusion 11 of the battery lid 5 is introduced between the sliding-movement restricting member 8 and the fixing plate 15 of the sliding mechanism 7. As a result, the pressing force of the protrusion 11 presses the sliding-movement restricting member 8 toward the lower housing unit 1. In addition, the sliding-movement restricting member 8 is then curved from the lower end 8b to the generally middle portion thereof outwardly toward the lower housing unit 1.

Figure 8:
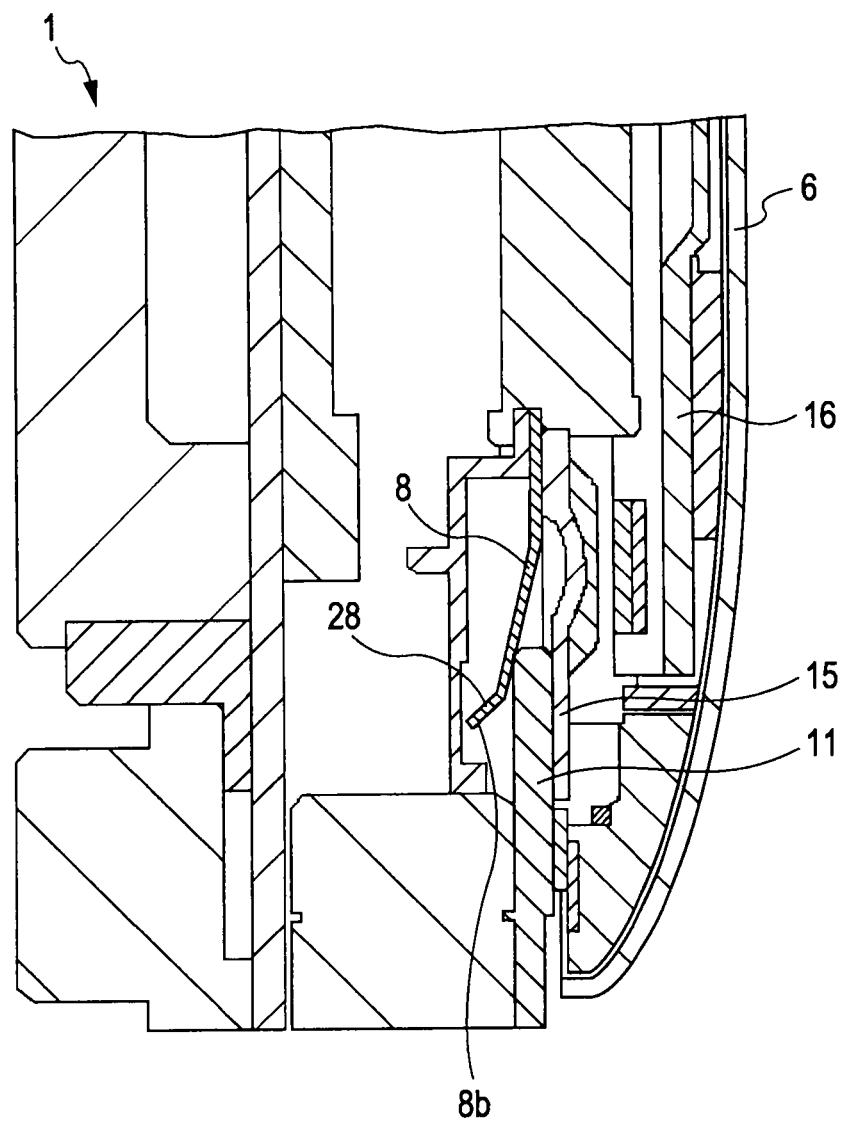
FIG. 8 is a cross-sectional diagram of the mobile phone according to the first embodiment along the line VIII-VIII of FIG. 7, where a battery lid is attached.
Figure 9:
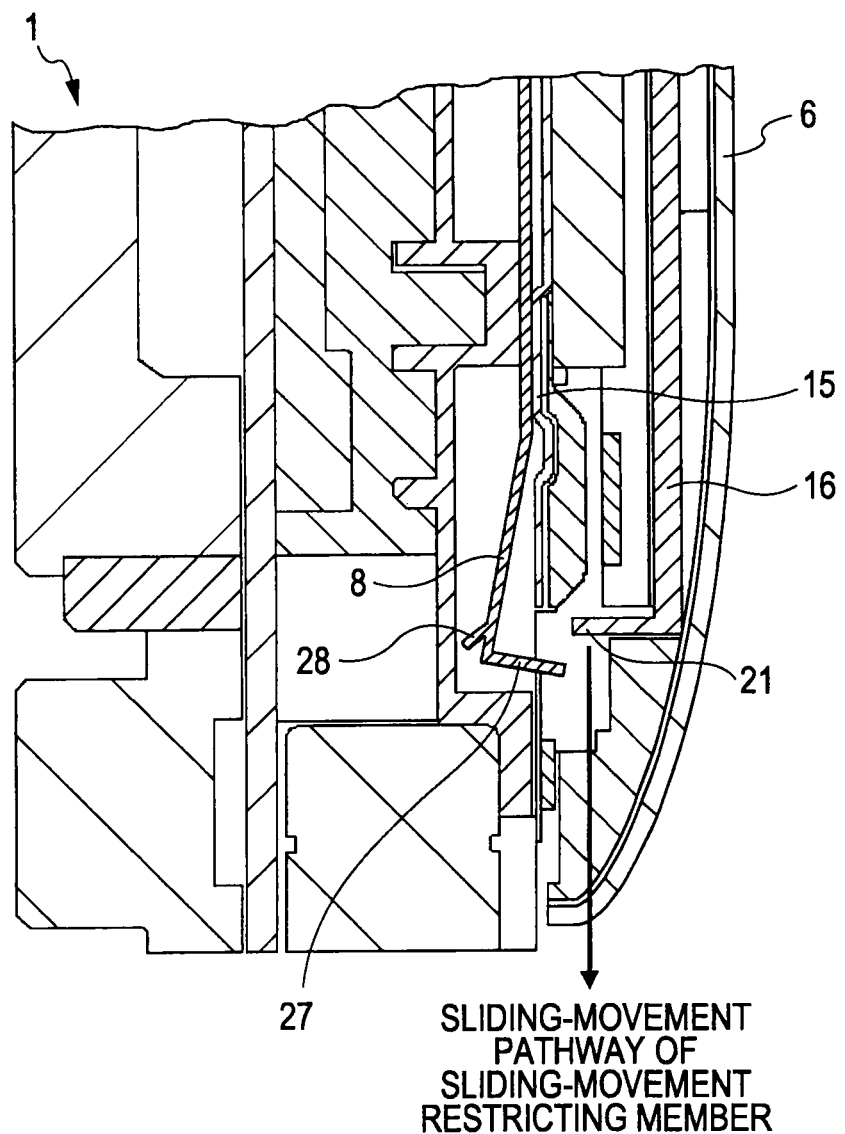
FIG. 9 is a cross-sectional diagram of the mobile phone according to the first embodiment along the line IX-IX of FIG. 7, where a battery lid is attached.

FIG. 8 is a cross-sectional view of the camera-mounting portion 2 of the lower housing unit 1 along the line VIII-VIII shown in FIG. 7. FIG. 9 is a cross-sectional view of the camera-mounting portion 2 of the lower housing unit 1 along the line IX-IX shown in FIG. 7.

When the battery lid 5 is attached to the lower housing unit 1, as shown in FIG. 8, the introduction bent portion 28 of the sliding-movement restricting member 8, which is being bent at an angle of about 45 degrees, is functioned to introduce the protrusion 11 of the battery lid 5 into between the sliding-movement restricting member 8 and the fixing plate 15 of the sliding mechanism 7.

When the protrusion 11 of the battery lid 5 is introduced into between the sliding-movement restricting member 8 and the fixing plate 15 of the sliding mechanism 7, the pressing force of the protrusion 11 presses the sliding-movement restricting member 8 toward the lower housing unit 1 and the sliding-movement restricting member 8 is then curved from the lower end 8b to the generally middle portion thereof outwardly toward the lower housing unit 1.

When the sliding-movement restricting member 8 is then curved from the lower end 8b to the generally middle portion thereof outwardly toward the lower housing unit 1, as shown in FIG. 9, the abutting portion 27 of the sliding-movement restricting member 8 is allowed to leave the sliding movement course of the slide plate 16 of the sliding mechanism 7. Therefore, while the battery lid 5 is being attached to the lower housing unit 1, the abutting portion 27 of the sliding-movement restricting member 8 and the abutting claw 21 of the slide plate 16 of the sliding mechanism 7 are not contacted with each other (in a state of avoiding the abutment=unlocked state). As a result, the camera cover 6 fixed on the slide plate 16 is allowed to slidably move in the longitudinal direction of the mobile phone.

[Operation for Controlling Sliding Movement without Attachment of Battery Lid]

FIG. 6C is a diagram illustrating the mobile phone where the battery lid 5 is being detached from the lower housing unit 1, obliquely viewed from the battery lid 5. As shown in FIG. 6C, when the battery lid 5 is removed from the lower housing unit 1, the protrusion 11 of the battery lid 5 is pulled out of between the sliding-movement restricting member 8 and the fixing plate 15 of the sliding mechanism 7.

Figure 10:
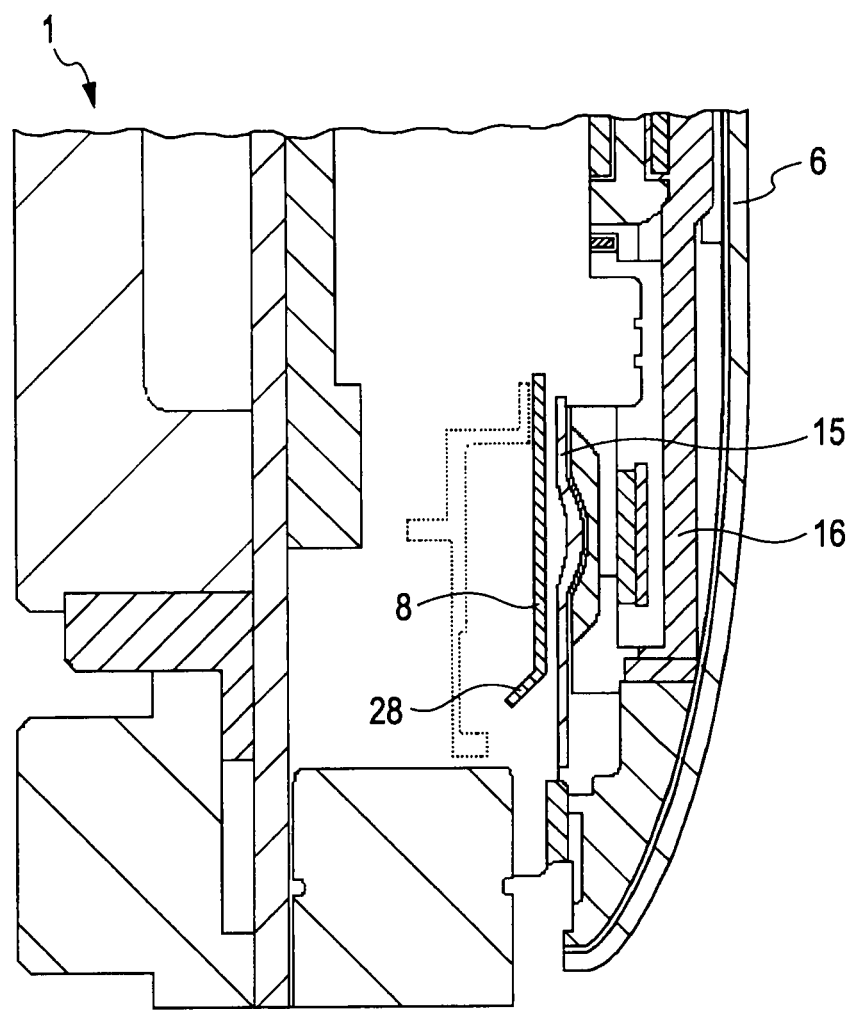
FIG. 10 is a cross-sectional diagram of the mobile phone according to the first embodiment along the line X-X of FIG. 7, where a battery lid is not attached.
Figure 11:
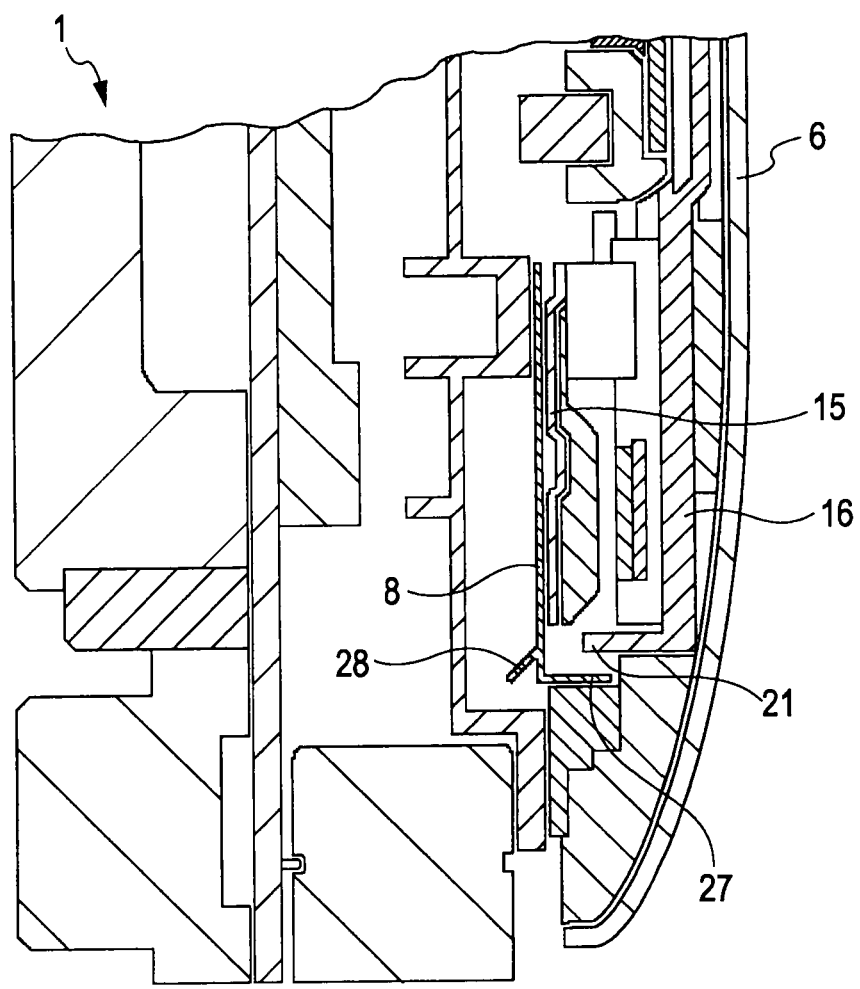
FIG. 11 is a cross-sectional diagram of the mobile phone according to the first embodiment along the line XI-XI of FIG. 7, where a battery lid is not attached.

FIG. 10 is a cross-sectional diagram of the camera-mounting portion 2 of the lower housing unit 1 when the battery lid 5 is being detached, along the line X-X shown in FIG. 7. FIG. 11 is a cross-sectional diagram of the camera-mounting portion 2 of the lower housing unit 1 when the battery lid 5 is being detached, along the line XI-XI shown in FIG. 7.

As described above, while the protrusion 11 of the battery lid 5 is being introduced between the sliding-movement restricting member 8 and the fixing plate 15 of the sliding mechanism 7, the sliding-movement restricting member 8 is being curved from the lower end 8b to the generally middle portion thereof outwardly toward the lower housing unit 1. However, when the protrusion 11 of the battery lid 5 is pulled out of between the sliding-movement restricting member 8 and the fixing plate 15 of the sliding mechanism 7, as shown in FIG. 10, the sliding-movement restricting member 8 is recovered from the curved configuration thereof to its plate shape before the incurve (original configuration).

If the sliding-movement restricting member 8 is recovered from the curved configuration thereof to its original configuration, as shown in FIG. 11, the abutting portion 27 of the sliding-movement restricting member 8 and the abutting claw 21 of the slide plate 16 of the sliding mechanism 7 are capable of being contacted with each other (in a locked state).

If the mobile phone is in a locked state, the camera cover 6 fixed on the slide plate 16 is allowed to slide in the longitudinal direction of the mobile phone as shown in FIG. 6B. In this case as shown in FIG. 11, the abutting portion 27 of the sliding-movement restricting member 8 and the abutting claw 21 of the slide plate 16 of the sliding mechanism 7 are brought into contact with each other, thereby allowing the sliding movement of the camera cover 6 fixed on the sliding plate 16 to be prevented. Therefore, when the battery lid 5 is removed from the lower housing unit 1, the sliding movement of the camera cover 6 via the slide plate 16 can be restricted.

Effects of First Embodiment

As is evident from the above description, the mobile phone of the first embodiment can obtain the following effects.

1. The sliding movement of the slide plate 16 is only allowed in a state that the battery lid 5 is attached to the predetermined position of the lower housing unit 1. In other words, if it is in a state that the battery lid 5 is apart from the predetermined position of the lower housing unit 1 at a predetermined distance or more, the sliding movement of the slide plate 16 can be prevented.

2. In a state that the battery lid 5 is apart from the predetermined position of the lower housing unit 1 at a predetermined distance or more, the sliding movement of the slide plate 16 can be prevented. Thus, it is possible to prevent the slide plate 16 from being slid while the user's finger is placed in the battery holder 4 when the battery lid 5 removed from the lower housing unit 1. Therefore, the user's finger can be prevented from being caught by the camera cover 6 fixed on the slide plate 16.

3. In a state that the battery lid 5 is apart from the predetermined position of the lower housing unit 1 at a predetermined distance or more, the sliding movement of the slide plate 16 can be prevented. A force in the direction other than one along which the slide plate 16 is slid is applied to the slide plate 16 and the camera cover 6. Therefore, it is possible to prevent the camera cover 6 and the sliding mechanism 7 from being deformed and damaged.

4. In a state that the battery lid 5 is apart from the predetermined position of the lower housing unit 1 at a predetermined distance or more, the sliding movement of the slide plate 16 can be inhibited. Thus, the battery lid 5 is removed from the lower housing unit 1 to safely liberate the entire battery holder 4. Therefore, the rechargeable battery 3 can be easily housed in the battery holder 4. In addition, the user can detach the battery lid 5 from the lower housing unit 1 and then removes the rechargeable battery 3 from the battery holder 4. Therefore, it is possible to prevent the camera cover 6 and the sliding mechanism 7 from being deformed and damaged. That is, such deformation and damage may be caused by application of force in the direction other than one along which the slide plate 16 is slid to the slide plate 16 and the camera cover 6. Such a force can be caused by forcibly removing the rechargeable battery 3 from the battery holder 4 or forcibly placing the rechargeable battery 3 in the battery holder 4 in a state that the camera cover 6 fixed on the slide plate 16 is moved on the battery holder 4 from which the battery lid 5 is being removed.

5. The camera cover 6 and the sliding mechanism 7 can be prevented from being deformed and damaged. Thus, the camera cover 6 and the sliding mechanism 7 may be formed using a material with typical strength without using a hardened material, such as a metal material. Alternatively, even if the camera cover 6 and the sliding mechanism 7 are formed using the material with typical strength, the camera cover 6 and the sliding mechanism 7 can be prevented from being deformed and damaged. Therefore, the camera cover 6 and the sliding mechanism 7 can be formed using a dielectric material such as metal material to avoid any influence on the antenna characteristics of a wireless radio-communication antenna mounted on the mobile phone to be influenced. In addition, the design of antenna characteristics and the arrangement of antenna can be prevented from becoming difficult.

Second Embodiment

Next, the configuration of a portable game device according to a second embodiment will be described.
[Configuration of a Portable Game Device]

Figure 12:
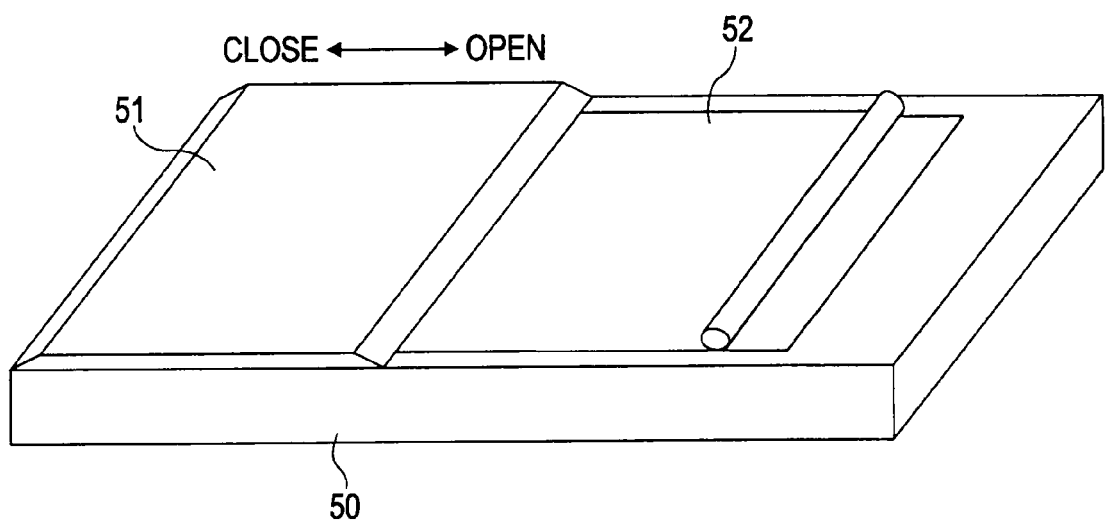
FIG. 12 is a perspective view of a portable game device according to a second embodiment, viewed from the back side thereof.

As shown in FIG. 12, the portable game device of the second embodiment includes a sliding cover 51 and a lid 52 on the back side of a housing 50. A sliding mechanism of the sliding cover 51 is substantially the same as the sliding mechanism 7 having the fixing plate 15 and the slide plate 16 with the claws 21 as described above with reference to FIG. 3 and the like. The sliding cover 51 is fixed on a slide plate 16 and capable of sliding in the open and close directions represented by the arrows in FIG. 12. In addition, the sliding cover 51 can serve the terminals formed on the housing 50. In addition, a sliding-movement restricting member 8, which has been described with reference to FIG. 4 and FIG. 5, is formed between the housing 50 and the slide plate 16. This sliding-movement restricting member 8 has an abutting portion 27 that abuts the abutting claw 21 of the slide plate 16, and the sliding movement of the sliding cover 51 can be restricted when the lid 52 is not attached to the housing 50.

Figure 13:
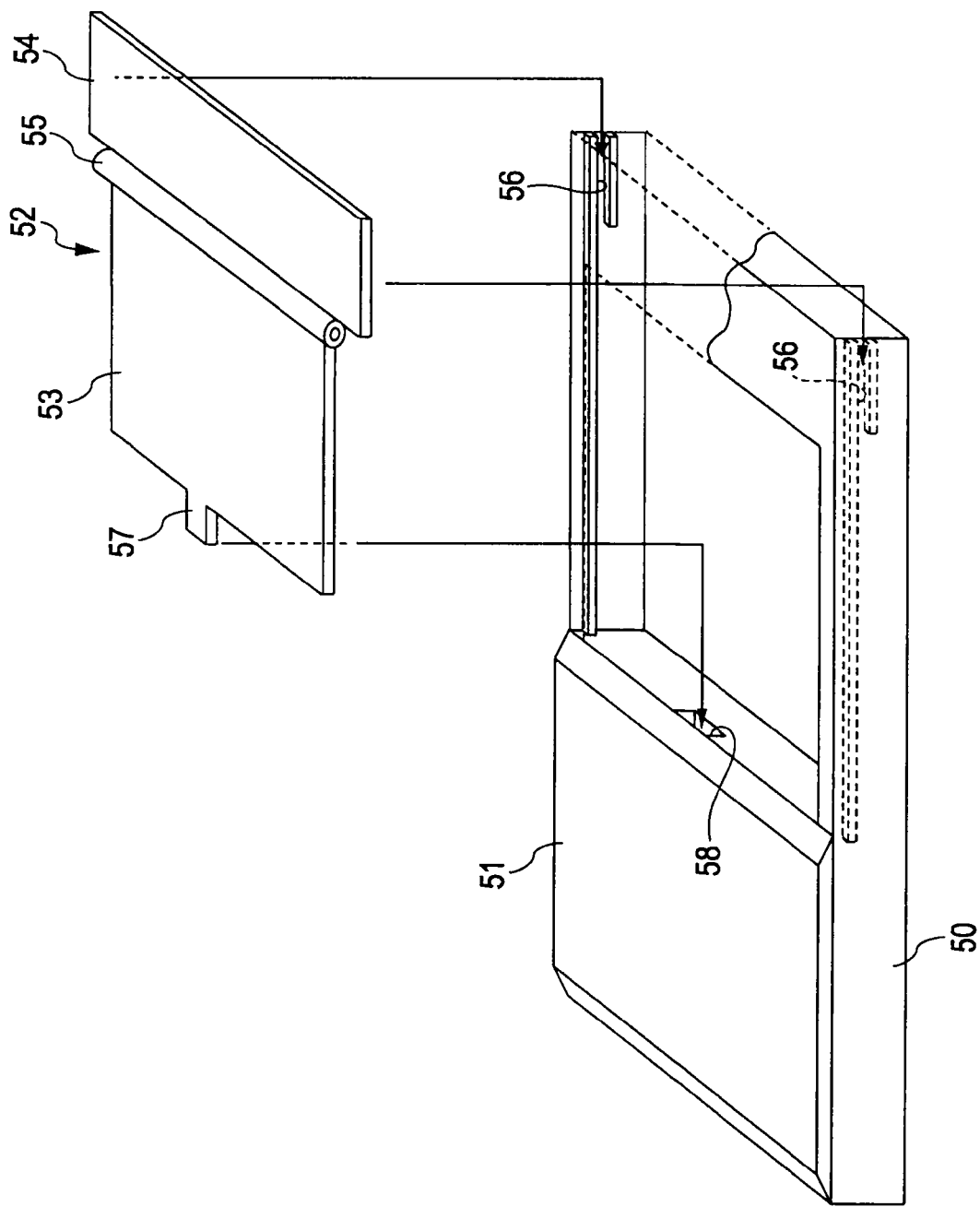
FIG. 13 is an exploded perspective view of the portable game device according to the second embodiment.

As shown in FIG. 13, the lid 52 includes a first lid portion 53 and a second lid portion 54 which are rotatably connected to each other using a hinge 55. The both lateral ends of the second lid portion 54 are inserted into the respective sliding grooves 56 formed in the both lateral sides of the housing 50. Thus, the lid 52 is mounted so that it will slidably move in the longitudinal direction of the portable game device.

The first lid portion 53 of the lid 52 has a protrusion 57 that corresponds to the protrusion 11 of the battery lid 5. The protrusion 57 can be inserted into a protrusion-inserting slot 58 formed in the housing 50. The protrusion 57 of the lid 52, which is being inserted into protrusion-inserting slot of the housing 50, is introduced into between sliding-movement restricting member 8 provided in housing member 50 and fixing plate 15 of a sliding mechanism 7. As shown in FIG. 5, the sliding-movement restricting member 8 is curved from the lower end 8b to the generally middle portion thereof outwardly toward the housing 50.

Figure 14:
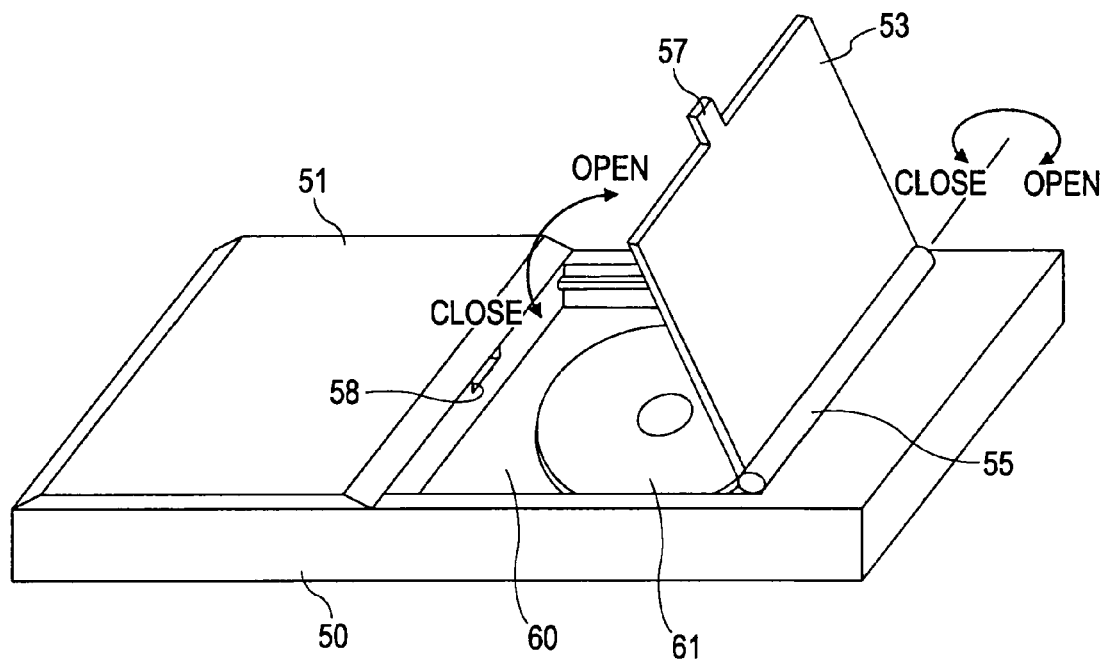
FIG. 14 is a perspective view of the portable game device according to the second embodiment, where the lid of the portable game device is being opened.
Figure 15:
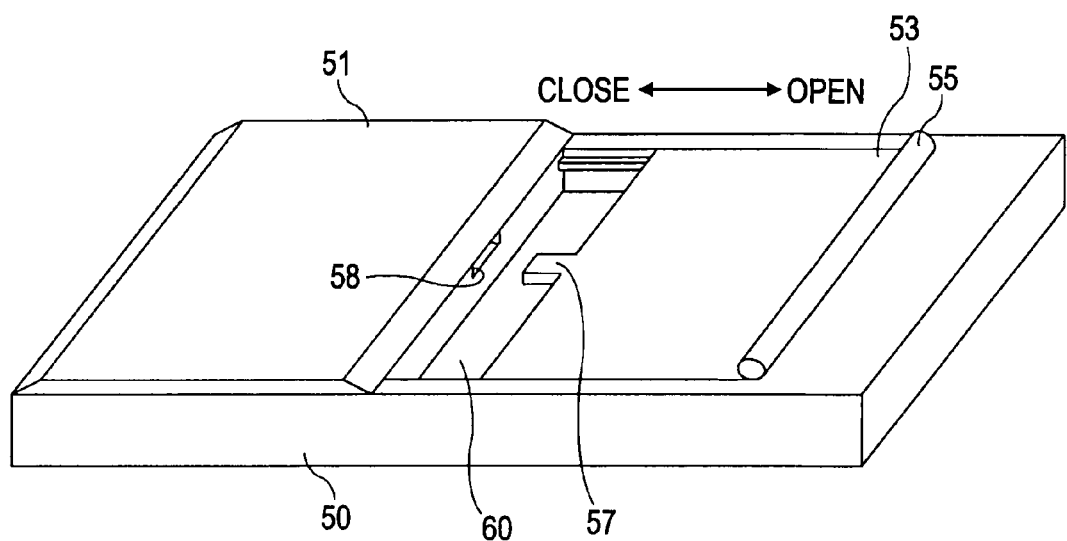
FIG. 15 is a perspective view of the portable game device, where the lid of the portable game device is slid in an open direction.

In addition, as shown in FIG. 14, the lid 52 serves as a lid of a housing chamber 60 for an optical disk 61 or semiconductor memory that stores a game program or the like. When the optical disc 61 is placed in the holder opening 60, the lid 52 is slid in the open direction represented by the arrow shown in FIG. 15, while the first lid portion 53 is turned in the open direction shown in FIG. 14 with respect to the hinge 55. As a result, the holder opening 60, which has been covered with the lid 52, is opened and the optical disc 61 is now allowed to be installed in the holder opening 60 or the installed optical disc 61 is removed from the holder opening 60.
[Operation for Controlling Sliding Movement of Portable Game Device]

Next, the portable game device according to the second embodiment having the configuration as described above will be further described with respect to the operation for controlling the sliding movement of the sliding cover 51.
[Operation for Controlling the Sliding Movement when Lid is Being Attached]

First, when the lid 52 is attached to the housing 50 and the protrusion 57 of the lid 52 is inserted into protrusion-inserting slot 58 of the housing 50, the protrusion 57 is introduced between the sliding-movement restricting member 8 and the fixing plate 15 of the sliding mechanism 7. Then, the pressing force of the protrusion 57 presses the sliding-movement restricting member 8 toward the housing 50. Then, as shown in FIG. 5, the sliding-movement restricting member 8 is curved from the lower end 8b to the generally middle portion thereof outwardly toward the housing 50.

When the sliding-movement restricting member 8 is then curved from the lower end 8b to the generally middle portion thereof outwardly toward the housing 50, in a manner similar to the description of FIG. 9, the abutting portion 27 of the sliding-movement restricting member 8 is allowed to leave the sliding-movement pathway of the slide plate 16 of the sliding mechanism 7. Therefore, while the lid 52 is being attached to the housing 50, the abutting portion 27 of the sliding-movement restricting member 8 and the abutting claw 21 of the slide plate 16 of the sliding mechanism 7 are not contacted with each other (in a state of avoiding the abutment, i.e., in an unlocked state). Then, the sliding cover 51 fixed on the slide plate 16 is allowed to slidably move in the open and close directions indicated by the arrows in FIG. 12.
[Operation for Controlling Sliding Movement when Lid is Being Detached]

Next, as described above, while the protrusion 57 of the lid 52 is being introduced between the sliding-movement restricting member 8 and the fixing plate 15 of the sliding mechanism 7, the sliding-movement restricting member 8 is being curved from the lower end 8b to the generally middle portion thereof outwardly toward the housing 50. However, when the protrusion 57 of the lid 52 is pulled out of between the sliding-movement restricting member 8 and the fixing plate 15 of the sliding mechanism 7, as shown in FIG. 10, the sliding-movement restricting member 8 is recovered from the curved configuration thereof to its plate shape before the incurve (original configuration).

If the sliding-movement restricting member 8 is recovered from the curved configuration thereof to its original configuration, in a manner similar to the description of FIG. 11, the abutting portion 27 of the sliding-movement restricting member 8 and the abutting claw 21 of the slide plate 16 of the sliding mechanism 7 are capable of being contacted with each other (in an unlocked state).

If the portable game device is in a locked state, the sliding cover 51 fixed on the slide plate 16 is allowed to slidably move in the open direction indicated by the arrow in FIG. 12. In this case, as is already described with reference to FIG. 11, the abutting portion 27 of the sliding-movement restricting member 8 and the abutting claw 21 of the slide plate 16 of the sliding mechanism 7 are brought into contact with each other, thereby allowing the sliding movement of the sliding cover 51 fixed on the sliding plate 16 to be prevented. Therefore, when the lid 52 is removed from the housing 50, the sliding movement of the sliding cover 51 via the slide plate 16 can be restricted.

Effects of Second Embodiment

As is evident from the above description, the portable game device of the second embodiment can obtain the following effects.

1. The sliding movement of the slide plate 16 is only allowed in a state that the lid 52 is attached to the predetermined position of the housing 50. In other words, if it is in a state that the lid 52 is apart from the predetermined position of the housing 50 at a predetermined distance or more, the sliding movement of the slide plate 16 can be prevented.

2. In a state that the lid 52 is apart from the predetermined position of the housing 50 at a predetermined distance or more, the sliding movement of the slide plate 16 can be prevented. Thus, it is possible to prevent the slide plate 16 from being slid while the user's finger is placed in the holder opening 60 when the lid 52 removed from the housing 50. Therefore, the user's finger can be prevented from being caught by the sliding cover 51 fixed on the slide plate 16.

3. In a state that the lid 52 is apart from the predetermined position of the housing 50 at a predetermined distance or more, the sliding movement of the slide plate 16 can be prevented. A force in the direction other than one along which the slide plate 16 is slid is applied to the slide plate 16 and the sliding cover 51. Therefore, it is possible to prevent the sliding cover 51 and the sliding mechanism 7 from being deformed and damaged.

4. In a state that the lid 52 is apart from the predetermined position of the housing 50 at a predetermined distance or more, the sliding movement of the slide plate 16 can be prevented. Therefore the lid 52 can be removed from the housing 50 to safely liberate the entire holder opening 60. Accordingly, the optical disc 61 or the like can be easily housed in the holder opening 60, or the optical disc 61 or the like can be easily removed from the holder opening 60. Therefore, it is possible to prevent the sliding cover 51 and the sliding mechanism 7 from being deformed and damaged. That is, in general, such deformation and damage will occur when the user may forcibly tries to take the optical disc or the like out of the holder opening 60 or forcibly tries to place the optical disc or the like in the holder opening 60 in a state that the sliding cover 51 fixed on the slide plate 16 is moved on the holder opening 60 from which the lid 52 has been removed. In this case, a force in the direction other than one along which the slide plate 16 is slid is applied to the slide plate 16 and the sliding cover 51. Therefore, it is possible to prevent the sliding cover 51 and the sliding mechanism 7 from being deformed and damaged.

5. The sliding cover 51 and the sliding mechanism 7 can be prevented from being deformed and damaged. Thus, the sliding cover 51 and the sliding mechanism 7 may be formed using a material with typical strength without using a hardened material, such as a metal material. Alternatively, even if the sliding cover 51 and the sliding mechanism 7 are formed using the material with typical strength, the sliding cover 51 and the sliding mechanism 7 can be prevented from being deformed and damaged. In other words, even if it usually forms sliding cover 51 and a sliding mechanism 7 by a strong material, modification and breakage of the sliding cover 51 or the sliding mechanism 7 can be prevented. Therefore, the sliding cover 51 and the sliding mechanism 7 may be formed by dielectric material, such as a metal material to prevent any undesired influence on antenna characteristics of the wireless communications antenna and non-contact wireless communications antenna used for the portable game device or any disadvantage of complicating the design or installation of antenna characteristics.

Modified Embodiments

The above embodiments have been described using exemplary mobile phone and portable game device. Any embodiment will be applied to any kind of devices and storage containers equipped with lids for their openings. That is, the device or container includes a sliding member mounted on a housing member and capable of performing a sliding movement, an opening formed in a position where the sliding member is overlapped when the sliding member is slidably moved, and a lid for the opening.

For example, any embodiment is applicable to any of a microcellular phone (PHS; personal handy phone system), a personal digital assistance (PDA), a digital camera device, digital video camera equipment, a note type or desktop type personal computer device, a television receiver, a music player device, and so on.

Finally, each of the aforementioned embodiments may be part of other embodiments.

For this reason, it is noted that the claimed invention is not limited to any of the aforementioned embodiments and various kinds of modifications may be performed depending on design requirements and other factors insofar as they are within the scope of the appended claims or the equivalents thereof.

What is claimed is:

1. A slide opening/closing device comprising:
   a housing;
   an opening formed in the housing;
   a lid with a protrusion, the lid being configured to cover the opening;
   a sliding member having an abutting claw, the sliding member being mounted on the housing proximal to the opening and at least partially covering the lid and opening when sliding in one moving direction; and
   a sliding-movement restricting member, which includes an abutting portion and which is made of an elastic material, the abutting portion being configured to abut the abutting claw of the sliding member when the lid is detached from covering the opening, and the abutting portion is configured to be displaced from a path of the abutting claw that is in the one moving direction when the lid is attached to the housing to cover the opening.

2. The slide opening/closing device according to claim 1, wherein the protrusion of the lid is configured to contact the sliding-movement restricting member to displace the abutting portion away from the path of the abutting claw when the lid is attached to cover the opening.

3. The slide opening/closing device according to claim 2, wherein in a state that the lid of the opening is attached to a predetermined location of the housing, the sliding-movement restricting member is in a curved state by being subjected to a pressing force by the protrusion of the lid to release abutment of the abutting portion to the abutting claw of the sliding member to allow the sliding member to be slide.

4. The slide opening/closing device according to claim 3, wherein in a state that the lid of the opening is detached from the predetermined location of the housing at a predetermined distance or more, the sliding-movement restricting member is released from the pressing force caused by the protrusion of the lid to recover the sliding-movement restricting member from the curved state to an original state, and the abutting claw of the sliding member is brought into contact with the abutting portion to prevent the sliding member from sliding.

5. The slide opening/closing device according to claim 1, wherein the housing is configured to have a camera mounted thereon, and a slide cover is mounted on the sliding member which is configured to cover a lens of the camera.

6. The slide opening/closing device according to claim 1, wherein the opening is configured to hold a battery.

7. The slide opening/closing device according to claim 1, wherein the opening is configured to hold a recording medium.

8. A method of restricting sliding movement of a sliding member, implemented on a slide opening/closing device that includes a housing, an opening formed in the housing, a lid with a protrusion, the lid being configured to cover the opening, the sliding member having an abutting claw, the sliding member being mounted on the housing proximal to the opening and at least partially covering the lid when sliding in one moving direction, and a sliding-movement restricting member which includes an abutting portion and which is made of an elastic material, the method comprising:

abutting, with the abutting portion of the sliding-movement restricting member, the abutting claw of the sliding member when the lid is detached from covering the opening; and displacing the abutting portion of the sliding-movement restricting member from a path of the abutting claw that is in the one moving direction when the lid is attached to the housing to cover the opening.

9. An electronic apparatus comprising:
an electronic device;
a slide opening/closing device including
    a housing upon which the electronic device is mounted;
    an opening formed in the housing;
    a lid with a protrusion, the lid being configured to cover the opening;
    a sliding member having an abutting claw, the sliding member being mounted on the housing proximal to the opening and at least partially covering the lid and opening when sliding in one moving direction; and
    a sliding-movement restricting member, which includes an abutting portion and which is made of an elastic material, the abutting portion being configured to abut the abutting claw of the sliding member when the lid is detached from covering the opening, and the abutting portion is configured to be displaced from a path of the abutting claw that is in the one moving direction when the lid is attached to the housing to cover the opening.

10. A mobile terminal device comprising:
an antenna configured to perform wireless communication;
an electronic device;
a slide opening/closing device including
    a housing upon which the electronic device mounted;
    an opening formed in the housing;
    a lid with a protrusion, the lid being configured to cover the opening;
    a sliding member having an abutting claw, the sliding member being mounted on the housing proximal to the opening and at least partially covering the lid and opening when sliding in one moving direction; and
    a sliding-movement restricting member, which includes an abutting portion and which is made of an elastic material, the abutting portion being configured to abut the abutting claw of the sliding member when the lid is detached from covering the opening, and the abutting portion is configured to be displaced from a path of the abutting claw that is in the one moving direction when the lid is attached to the housing to cover the opening.

* * * * *